(12) United States Patent
Poe et al.

(10) Patent No.: US 11,218,385 B2
(45) Date of Patent: Jan. 4, 2022

(54) NETWORK ENTITY AND METHOD FOR IDENTIFIER ALLOCATING AND/OR MAPPING OF NETWORK SERVICES

(71) Applicant: HUAWEI TECHNOLOGIES CO., LTD., Guangdong (CN)

(72) Inventors: Wint Yi Poe, Munich (DE); Ishan Vaishnavi, Munich (DE); Riccardo Trivisonno, Munich (DE); Qing Wei, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 134 days.

(21) Appl. No.: 16/680,277

(22) Filed: Nov. 11, 2019

(65) Prior Publication Data

US 2020/0084122 A1 Mar. 12, 2020

Related U.S. Application Data

(63) Continuation of application No. PCT/EP2017/079385, filed on Nov. 16, 2017.

(51) Int. Cl.
*H04L 12/24* (2006.01)
*H04W 4/50* (2018.01)
(Continued)

(52) U.S. Cl.
CPC ...... *H04L 41/5054* (2013.01); *H04L 41/5022* (2013.01); *H04L 41/5025* (2013.01);
(Continued)

(58) Field of Classification Search
None
See application file for complete search history.

(56) References Cited

U.S. PATENT DOCUMENTS

2016/0050697 A1 2/2016 Ahmavaara
2017/0180246 A1 6/2017 Zheng
(Continued)

FOREIGN PATENT DOCUMENTS

CN 103546304 A 1/2014
EP 2901300 A1 8/2015
(Continued)

OTHER PUBLICATIONS

Author Unknown, pCR 28.530 Use case and requirements for activate a network slice instance, Doc. No. S5-175228, pp. 1-2, Oct. 20, 2017.*
(Continued)

*Primary Examiner* — Christopher M Crutchfield
(74) *Attorney, Agent, or Firm* — Huawei Technologies Co., Ltd.

(57) ABSTRACT

In a mobile communication system being configured to comprise network slice instances and network subnet slice instances, a network entity performs identifier mapping in connection with services provided. In the identifier mapping operation, the network device receives a first identifier of a first network service. It then generates a second identifier of a second network service, and maps the second identifier to the first identifier. One of the first identifier and the second identifier is a network slice instance ID (NSI-ID).

19 Claims, 6 Drawing Sheets

(51) Int. Cl.
  *H04W 28/24* (2009.01)
  *H04W 16/02* (2009.01)
  *H04W 48/18* (2009.01)
  *H04W 4/44* (2018.01)
(52) U.S. Cl.
  CPC .............. *H04W 4/50* (2018.02); *H04W 16/02* (2013.01); *H04W 28/24* (2013.01); *H04W 48/18* (2013.01); *H04W 4/44* (2018.02)

(56) References Cited

U.S. PATENT DOCUMENTS

| | | | |
|---|---|---|---|
| 2017/0208019 | A1 | 7/2017 | Shimojou et al. |
| 2017/0303259 | A1* | 10/2017 | Lee ................. H04W 12/08 |
| 2018/0145889 | A1 | 5/2018 | Xu et al. |
| 2018/0191580 | A1 | 7/2018 | Xia et al. |
| 2018/0295055 | A1 | 10/2018 | Zheng |
| 2019/0261186 | A1 | 8/2019 | Xu et al. |
| 2019/0281503 | A1 | 9/2019 | Xu et al. |

FOREIGN PATENT DOCUMENTS

| | | | |
|---|---|---|---|
| EP | 3285439 | A1 | 2/2018 |
| EP | 3334089 | A1 | 6/2018 |
| EP | 3648525 | A1 | 5/2020 |
| JP | 2017011467 | A | 1/2017 |
| JP | 2017068564 | A | 4/2017 |
| WO | 2014051618 | A1 | 4/2014 |
| WO | 2017035737 | A1 | 3/2017 |
| WO | 2017113201 | A1 | 7/2017 |
| WO | 2018076547 | A1 | 5/2018 |
| WO | 2018094667 | A1 | 5/2018 |
| WO | 2019020171 | A1 | 1/2019 |

OTHER PUBLICATIONS

Author Unknown, pCR 28.530 pCR 28.530 Use case and requirements for create network slice subnet instance, Doc. No. S5-175223, pp. 1-3, Oct. 20, 2017.*

Author Unknown, pCR 28.531 Add use case and requirements of network slice instance creation, Doc. No. S5-175119, pp. 1-3, Oct. 20, 2017.*

Author Unknown, pCR 28.530 Use case and requirements for modify a network slice instance, Doc. No. S5-175237, pp. 1-2, Oct. 20, 2017.*

Author Unknown, pCR 28.530 Use case and requirements for create of a network slice instance, Doc. No. S5-175230, pp. 1-2, 20 Oct. 20, 2017.*

H. Flinck et al.,"Network Slicing Management and Orchestration draft-flinck-slicing-management-00", Internet Engineering Task Force;Internet-Draft;Jul. 3, 2017,total 10pages.

ETSI GS NFV-MAN 001 V1.1.1 (Dec. 2014),Network Functions Virtualisation (NFV);Management and Orchestration,total 184 pages.

3GPP TS 23.501 V1.1.0 (Jul. 2017);3rd Generation Partnership Project;Technical Specification Group Services and System Aspects-;System Architecture for the 5G System;Stage 2(Release 15);total 165 pages.

3GPP TS 22.261 V16.1.0 (Sep. 2017);3rd Generation Partnership Project;Technical Specification Group Services and System Aspects-;Service requirements for the 5G system;Stage 1 (Release 16);total 52 pages.

3GPP TR 23.799 V14.0.0 (Dec. 2016);3rd Generation Partnership Project;Technical Specification Group Services and System Aspects;Study on Architecture for Next Generation System(Release 14);total 522 pages.

3GPP TR 28.801 V1.3.0 (Aug. 2017);3rd Generation Partnership Project;Technical Specification Group Services and System Aspects;Telecommunication management;Study on management and orchestration of network slicing for nextgeneration network (Release 15),total 79 pages.

3GPP TS 23.501 V1.5.0 (Nov. 2017);3rd Generation Partnership Project;Technical Specification Group Services and System Aspects-;System Architecture for the 5G System;Stage 2(Release 15);total 170 pages.

3GPP TS 23.502 V1.3.0 (Nov. 2017);3rd Generation Partnership Project;Technical Specification Group Services and System Aspects;Procedures for the 5G System;Stage 2(Release 15);total 215 pages.

3GPP TS 28.525 V14.1.0 (Jun. 2017);3rd Generation Partnership Project;Technical Specification Group Services and System Aspects;Telecommunication management;Life Cycle Management (LCM) for mobile networks that include virtualized network functions; Requirements(Release 14);total 47 pages.

3GPP TS 28.526 V14.0.0 (Mar. 2017);3rd Generation Partnership Project;Technical Specification Group Services and System Aspects;Telecommunication management;Life Cycle Management (LCM) for mobile networks that include virtualized network functions; Procedures(Release 14);total 36 pages.

3GPP TS 28.530 V0.3.0 (Nov. 2017);3rd Generation Partnership Project;Technical Specification Group Services and System Aspects;Telecommunication management;Management of network slicing in mobile networks;Concepts, use cases and requirements (Release 15),total 18 pages.

3GPP TS 28.531 V0.1.0 (Oct. 2017);3rd Generation Partnership Project;Technical Specification Group Services and System Aspects;Telecommunication Management;Provisioning of network slicing for 5G networks and services (Release 15),total 11 pages.

3GPP TR 28.800 V0.9.1 (Nov. 2017);3rd Generation Partnership Project;Technical Specification Group Services and System Aspects;Telecommunication management;Study on management and orchestration architecture of next generation networks and services(Release 15);total 19 pages.

* cited by examiner

NETWORK ENTITY AND METHOD FOR IDENTIFIER ALLOCATING AND/OR MAPPING OF NETWORK SERVICES

CROSS-REFERENCE TO RELATED APPLICATIONS

This application is a continuation of International Application No. PCT/EP2017/079385, filed on Nov. 16, 2017, which is hereby incorporated by reference in its entirety.

TECHNICAL FIELD

The present invention generally relates to the field of telecommunications network technology. Particularly, the present invention relates to a network entity on a service layer for identifier allocating and/or identifier mapping of network services, and to a method, at a network entity on a service layer, for identifier allocating and/or identifier mapping of network services.

BACKGROUND

The concept of network slice or network slicing is introduced in fifth generation, 5G, communication systems in order to address the various requirements from multiple vertical industries assuming a shared network infrastructure. Correspondingly, network services can be customized based on the requirements of different use cases, thereby increasing the network operation efficiency.

The Network slicing concept is expected to be one of the key features in the 5th Generation mobile technology (5G) which will be deployed by 2020. Network slicing enables 5G mobile telecommunications system to integrate vertical industries by providing a service-tailored network function provisioning scheme.

The network slicing concept is not limited to one single operator network. Network services offered by a service provider can be composed of multiple network slices, which again can be allocated across multiple or different operator networks. Each operator network is based on a proprietary identification management. Therefore, the service provider does not have a simple end-to-end management process in case of a failure or a modification of a network resource in anyone of the multiple operator networks. Based on the complex slicing architecture across multiple operators it is difficult for the service provider to easily detect a failure of a network resource or a modification of a network resource.

SUMMARY

Having recognized the above-mentioned disadvantages and problems, the present invention aims to improve the state of the art. In particular, an object of the present invention is to provide a network entity and a method for improving identifier allocation and/or identifier mapping of network services.

The above-mentioned object is achieved by the features of the independent claims. Further embodiments of the invention are apparent from the dependent claims, the description and the figures.

According to a first aspect, the invention relates to a network entity on a service layer for identifier allocating and/or identifier mapping of network services, the network entity is configured to receive at least one identifier of a network service, generate at least one further identifier of a further network service, and map the further identifier to at least one received identifier.

Thereby, the network entity advantageously enables a dynamic identification scheme for slices. The advantage of generating a further identifier, in particular a local identifier, is to support an efficient scalability of the slicing concept. It also advantageously supports resilience features, in particular enhancing fault tolerance in case of a local failure or local change of network services. Further, this network entity advantageously improves abstraction features, in particular of the slice or network slice during its life cycle. Further, this network entity has the advantage to hide the further, in particular local, identifiers from the identifiers from other network services.

A network service is defined as a managed entity offered by an operator or service provider including a service level agreement. A network service could include a 5G communication service, a slice, part of a slice, a network function, or an infrastructure.

In particular, a further network service comprises a further managed network service.

A service layer can be a service layer, a network slice instance layer, a network subnet slice instance layer or an infrastructure layer in a management function architecture.

According to a first implementation of the network entity according to the first aspect, the network entity is further configured to send the at least one further identifier to at least one second network entity for identifier allocating and/or identifier mapping.

Thereby, the resilience and abstraction features of the end to end identification management is advantageously improved and simplified.

According to a second implementation of the network entity according to the first aspect, the network entity is located on a first service layer and the second network entity is located on a second service layer.

According to a third implementation of the network entity according to the first aspect, the first service layer is an upper service layer compared to the second service layer.

Thereby, the allocating and/or identifier mapping procedure is advantageously enabled from an upper layer to a lower layer in a top-down mapping process. Further, the slicing management across different layers is more dynamic than a central slice management. Top-down mapping is defined as mapping identifiers starting from an upper service layer to a lower service layer.

According to a fourth implementation of the network entity according to the first aspect, the first service layer is a lower service layer compared to the second service layer.

Thereby, the slicing management across different layers is more dynamic than a central slice management. Further, the allocating and/or identifier mapping procedure is advantageously enabled from a lower layer to an upper layer in a bottom-up mapping process. Bottom-up mapping is defined as mapping identifiers starting from a lower service layer to an upper service layer.

According to a fifth implementation of the network entity according to the first aspect, the network entity is located on a first service layer and the second network entity is located on a second service layer, wherein the first service layer is the same service layer as the second service layer.

Thereby, an identifier allocating and/or mapping on the same service layer or a horizontal mapping of identifiers is advantageously enabled. Further, it is also possible, that each service layer is managed or controlled by a different network management function. Furthermore, the first network entity can be located in a different operator network then the second network entity.

According to a sixth implementation of the network entity according to the first aspect, the received identifier is a service instance ID (S-ID) and the at least one further identifier is a network service instance ID (NS-ID) or the received identifier is a network service instance ID (NS-ID) and the at least one further identifier is a network slice instance ID (NSI-ID) or the received identifier is a network slice instance ID (NSI-ID) and the at least one further identifier is a network subnet slice instance ID (NSSI-ID) or the received identifier is a network subnet slice instance ID (NSSI-ID) and the at least one further identifier is at least one infrastructure resource instance ID.

Thereby, the allocating and/or identifier mapping procedure is advantageously enabled end-to end across the layers in a top-down mapping process.

According to a seventh implementation the network entity according to the first aspect, the received identifier is the at least one infrastructure resource instance ID and the at least one further identifier is the network subnet slice instance ID (NSSI-ID) or the received identifier is the at least one network subnet slice instance ID (NSSI-ID) and the at least one further identifier is the network slice instance ID (NSI-ID) the received identifier is the at least one network slice instance ID (NSI-ID) and the at least one further identifier is the network service instance ID (NS-ID) or the received identifier is the at least one network service instance ID (NS-ID) and the at least one further identifier is the service instance ID (S-ID).

Thereby, the allocating and/or identifier mapping procedure is advantageously enabled end-to end across the layers in a bottom up mapping process.

According to an eighth implementation of the network entity according to the first aspect, the mapping of the at least one further identifier to the at least one received identifier is based on a hashing mechanism.

Thereby, advantageously using identifier mapping in the network entity, in particular the local mapping component. Hashing has the advantage retrieving the mapped identifiers in an efficient and fast way.

According to a ninth implementation of the network entity according to the first aspect, the network entity is further configured to store the mapping of the at least one further identifier to the received identifier.

Thereby, decentralized storage of the generated further identifier is advantageously improving the scalability and speed of the end-to-end identifier allocating and/or identifier mapping process.

According to a tenth implementation of the network entity according to the first aspect, the network entity comprises at least one data base for storing mapped identifiers, wherein at least one database comprises an interface for controlling identifiers.

Thereby, the local storage of allocated and/or mapped identifiers, in particular keys as received identifiers and associated values as further or local identifiers advantageously enable a fast and direct access.

According to a eleventh implementation of the network entity according to the first aspect, the network entity comprises an interface for sending the at least one further identifier of the further network service according to the first implementation of the network entity according to a first aspect or for receiving the at least one identifiers of the network service according to the network entity according to the first aspect.

Thereby, this interface advantageously enables a bidirectional communication between the network entities for identifier mapping, in particular local mapping components. The interface supports a standardized communication between the local mapping components within technological domains owned by a single administrative domain or across technological domains owned by multiple administrative domains.

An administrative domain refers to a collection of systems and networks each operated by a single organization or administrative authority, such as an operator according to ETSI GS NFV-MAN 001 V1.1.1.

Considering an operator network, technological domains can be defined as systems or networks which have technically similar management attributes which could be the same vendor and the same technology such as a core network or access network or transport network or data centre networks.

According to a twelfth implementation of the network entity according to the first aspect, the network entity is attached to a network management function, wherein the network management function is responsible to manage to the same service layer as the network entity.

Thereby, the controlling of the local mapping of different network services is advantageously managed on the respective level improving the scalability and resilience of the managed slice or managed entity.

According to a thirteenth implementation of the network entity according to the first aspect, the network entity is further configured to allocate a generated further identifier to a new further network service or use the at least one further identifier of the further network service, and in case of using the at least one further identifier, send the allocated further identifier to the at least one second network entity for identifier allocating and/or identifier mapping.

The resilience of the end to end identification management is advantageously enhanced.

According to a fourteenth implementation of the network entity according to the first aspect, the network entity is further configured to replace the first received identifier by the new received identifier.

Thereby, the fault tolerance is advantageously reduced.

According to a fifteenth implementation of the network entity according to the first aspect, wherein in case a mapping is required for the single network slice selection assistance information (NSSAI) of a user equipment, the entity is further configured to generate the further identifier of the further network service, wherein the further network service is a service instance (NS) or a network slice instance (NSI) or network slice subnet instance (NSSI).

Thereby, the identification management for user equipment (UE) requesting to a service is advantageously enabled. Particularly, the mapping between the user equipment request (i.e., S-NSSAI) and an exposed service is advantageously enabled and also improves the identification management on different layers of slice management functions and their assigned network entities for identifier mapping, in particular their local mapping components.

According to a second aspect, the invention relates to a method, at a network entity on a service layer for identifier allocating and/or identifier mapping of network services, the method comprises the following steps of receiving at least one identifier of a network service, generating at least one further identifier of a further network service, and mapping the further identifier to at least one received identifier.

Thereby, the method advantageously enables a dynamic identification scheme for slices. The advantage of generating a further identifier, in particular a local identifier, is to support an efficient scalability of the slicing concept. It also advantageously supports resilience features, in particular enhancing fault tolerance in case of a local failure or local change of network services. Further, this method advantageously improves abstraction features, in particular of the slice or network slice during its life cycle. Further, this method has the advantage to hide the further, in particular local, identifiers from the identifiers from other network services.

According to a first implementation of the method according to the second aspect, the method comprises the further following step of sending the at least one further identifier to at least one second network entity for identifier allocating and/or identifier mapping.

Thereby, the resilience of the method is advantageously improved. Further, the fault risk of missing or wrong identifiers is advantageously reduced.

According to a second implementation of the method according to the second aspect, the network entity is located on a first service layer and the second network entity is located on a second service layer.

According to a third implementation of the method according to the second aspect, the first service layer is an upper service layer compared to the second service layer.

Thereby, the allocating and/or identifier mapping procedure is advantageously enabled from an upper layer to a lower layer in a top-down mapping process. Further, the slicing management across different layers is more dynamic than a central slice management. Top-down mapping is defined as mapping identifiers starting from an upper service layer to a lower service layer.

According to a fourth implementation of the method according to the second aspect, the first service layer is a lower service layer compared to the second service layer.

Thereby, the slicing management across different layers is more dynamic than a central slice management. Further, the allocating and/or identifier mapping procedure is advantageously enabled from a lower layer to an upper layer in a bottom-up mapping process. Bottom-up mapping is defined as mapping identifiers starting from a lower service layer to an upper service layer.

According to a further implementation of the network entity according to the first aspect, the network entity is located on a first service layer and the second network entity is located on a second service layer, wherein the first service layer is the same service layer as the second service layer.

Thereby, an identifier allocating and/or mapping on the same service layer or a horizontal mapping of identifiers is advantageously enabled. Further, it is also possible, that each service layer is managed or controlled by a different network management function. Furthermore, the first network entity can be located in a different operator network then the second network entity.

According to a fifth implementation of the method according to the second aspect, the received identifier is a service instance ID (S-ID) and the at least one further identifier is a network service instance ID (NS-ID) or the received identifier is a network service ID (NS-ID) and the at least one further identifier is a network slice instance ID (NSI-ID) or the received identifier is a network slice instance ID (NSI-ID) and the at least one further identifier is a network subnet slice instance ID (NSSI-ID) or the received identifier is a network subnet slice instance ID (NSSI-ID) and the at least one further identifier is at least one infrastructure resource instance ID.

Thereby, the allocating and/or identifier mapping procedure is advantageously enabled end-to end across the layers in a top-down mapping process.

According to a sixth implementation of the method according to the second aspect, the received identifier is the at least one infrastructure resource instance ID and the at least one further identifier is the network subnet slice instance ID (NSSI-ID) or the received identifier is the network subnet slice instance ID (NSSI-ID) and the at least one further identifier is the network slice instance ID (NSI-ID) the received identifier is the network slice instance ID (NSI-ID) and the at least one further identifier is the network service instance ID (NS-ID) or the received identifier is the network service instance ID (NS-ID) and the at least one further identifier is the service instance ID (S-ID).

Thereby, the allocating and/or identifier mapping procedure is advantageously enabled end-to end across the layers in a bottom up mapping process.

According to a seventh implementation of the method according to the second aspect, the mapping of the at least one further identifier to the at least one received identifier is based on a hashing mechanism.

Thereby, advantageously using identifier mapping in the network entity, in particular the local mapping component. Hashing has the advantage retrieving the mapped identifiers in an efficient and fast way.

According to an eighth implementation of the method according to the second aspect, the method comprises the following step of storing the mapping of the at least one further identifier to the received identifier.

Thereby, decentralized storage of the generated further identifier is advantageously improving the scalability and speed of the end-to-end identifier allocating and/or identifier mapping process.

According to a ninth implementation of the method according to the second aspect, the network entity comprises at least one data base for storing mapped identifiers, wherein at least one database comprises an interface for controlling identifiers.

Thereby, the local storage of allocated and/or mapped identifiers, in particular keys as received identifiers and associated values as further or local identifiers advantageously enable a fast and direct access.

According to a tenth implementation of the method according to the second aspect, the network entity comprises an interface for sending the at least one further identifier of the further network service according to the first implementation of the network entity according to a first aspect or for receiving the at least one identifiers of the network service according to the network entity according to the first aspect.

Thereby, this interface advantageously enables a bidirectional communication between the network entities for identifier mapping, in particular local mapping components. The interface support a standardized communication between the local mapping components within a technological domain or across technological or administrative domains.

An administrative domain refers to a collection of systems and networks each operated by a single organization or administrative authority, such as an operator according to ETSI GS NFV-MAN 001 V1.1.1.

Considering an operator network, technological domains can be defined as systems or networks which have technically similar management attributes which could be the same vendor and the same technology such as a core network or access network or transport network or data centre networks.

According to an eleventh implementation of the method according to the second aspect, the network entity is attached to a network management function, wherein the network management function is assigned to the same service layer as the network entity.

Thereby, the controlling of the local mapping of different network services is advantageously managed on the respective level improving the scalability and resilience of the managed slice or managed entity.

According to a twelfth implementation of the method according to the second aspect, the method comprises the following further steps of allocating a generated further identifier to a new further network service or use the at least one further identifier of the further network service, and in case of using the at least one further identifier, sending the allocated identifier to the at least one second network entity for identifier allocating and/or identifier mapping.

The resilience of the end to end identification management is advantageously enhanced.

According to a thirteenth implementation of the method according to the second aspect, the network entity is further configured to replace the first received identifier by the new received identifier.

Thereby, the fault tolerance is advantageously reduced.

According to a fourteenth implementation of the method according to the second aspect for end to end identification management for a slice, the slice is configured across multiple technological domains.

According to a fifteenth implementation of the method according to the second aspect the multiple technological domains are located in a single operator or across multiple operators.

More specifically, it should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

It shall further be understood that a preferred embodiment of the invention can also be any combination of the dependent claims or above embodiments with the respective independent claim.

These and other aspects of the invention will be apparent and elucidated with reference to the embodiments described hereinafter.

BRIEF DESCRIPTION OF THE DRAWINGS

The above aspects and implementation forms of the present invention will be explained in the following description of specific embodiments in relation to the enclosed drawings, in which.

DETAILED DESCRIPTION OF EMBODIMENTS OF THE INVENTION

Figure 1:
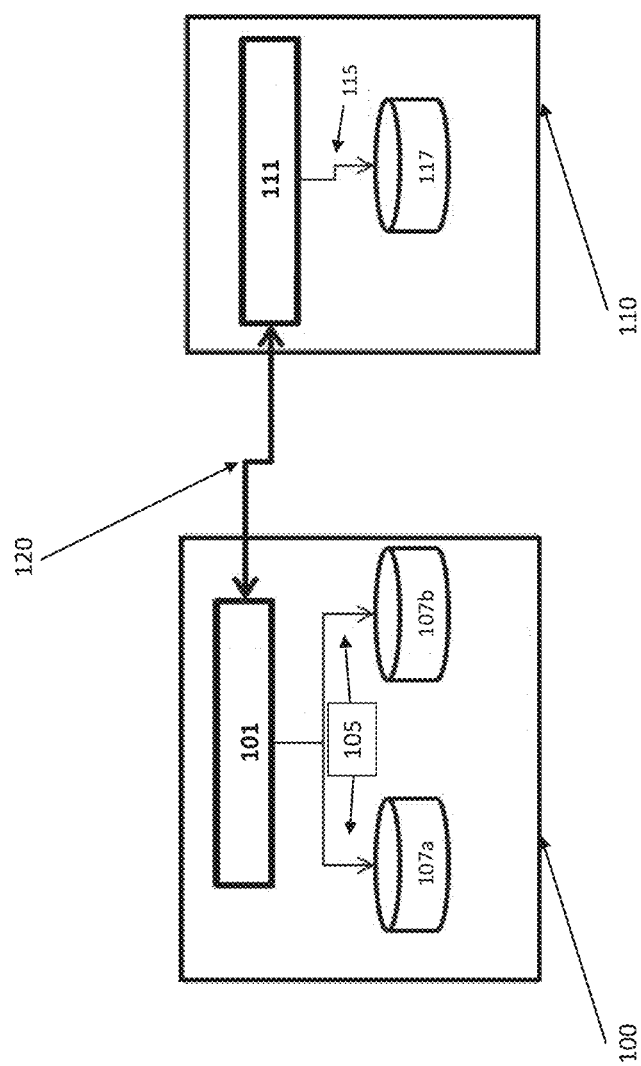
FIG. 1 shows a network entity according to an embodiment of the present invention.

FIG. 1 shows two network entities 100, 110 for identifier allocating and/or identifier mapping of network services. Each network entity 100, 110 is located on a service layer in the communication system.

The network entity 100, in particular a local mapping component 100, comprises a mapping function 101, in particular a local mapper 101, two databases 107a, 107b for storing identifiers and at least one interface 105 for accessing the databases 107a, 107b. Optionally, the network entity 100 comprises only one interface 105 for accessing multiple databases 107a, 107b. Further, the network entity 100 comprises an external interface 120, in particular ID management interface 120, for sending at least one further identifier of the network service or for receiving at least one identifier of the network service.

The external interface 120, in particular an ID management interface 120 is a bidirectional interface and configured to exchange local identifier related information. This external interface 120 enables communication between the network entities 100, 110. Further, the external interface 120 is adapted to support a cross-domain operation at any service layer. A local identifier is an identifier indicating a corresponding managed entity, for example a network slice instance and is generated by the network entity 100, 110.

The second network entity 110 comprises a mapping function 111, a database 117 for storing identifiers and one interface 115 for accessing the database 117.

The network entity 100, 110 on the service layer for identifier allocating and/or identifier mapping of network services is configured to receive the at least one identifier of the network service, generate at least one further identifier of a further network service, and map the further identifier to at least one received identifier.

Figure 2:
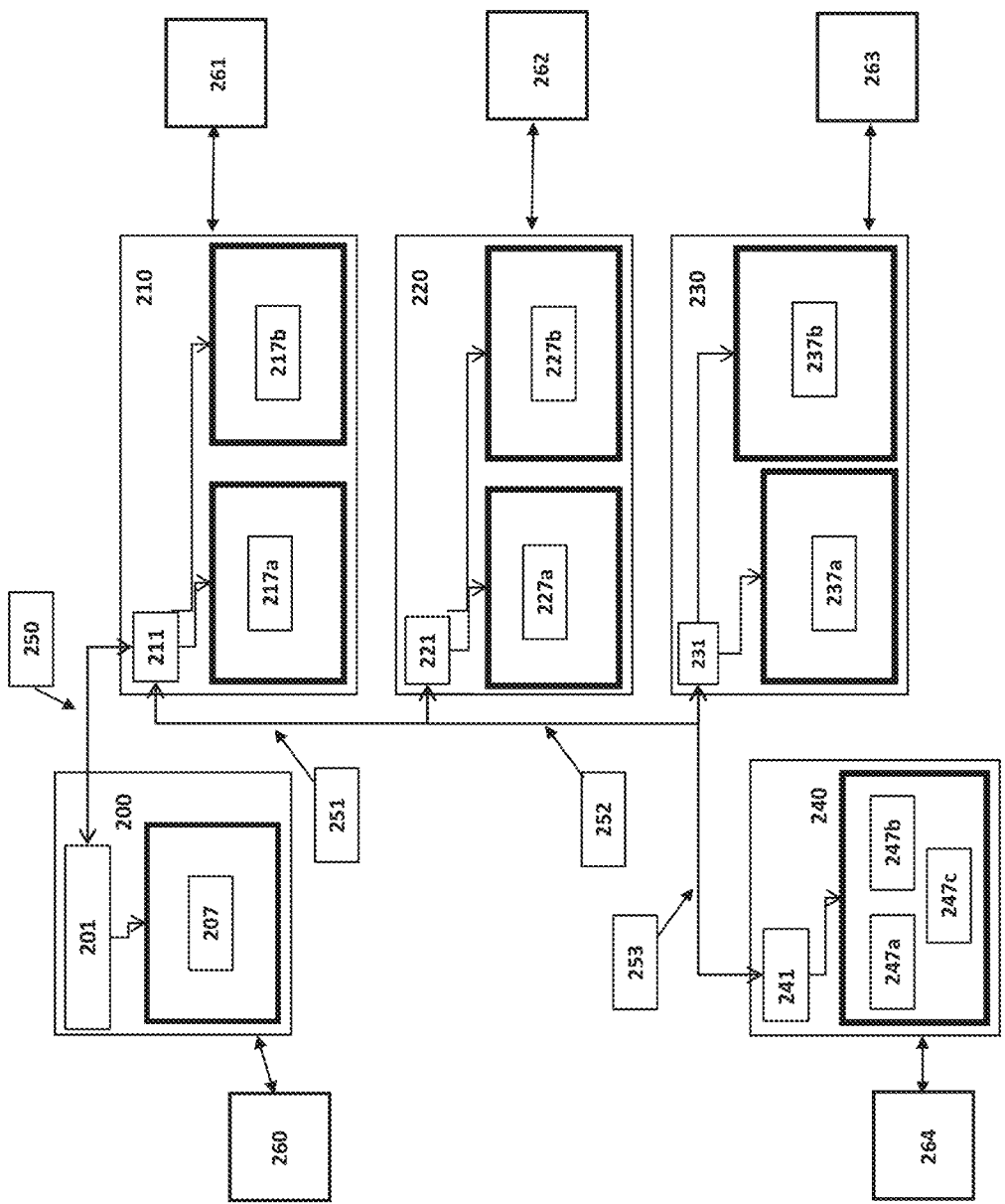
FIG. 2 shows a schematic diagram of a mapping according to an embodiment of the present invention.

FIG. 2 shows a schematic diagram of a mapping according to an embodiment of the present invention.

In this embodiment, multiple network entities 200, 210, 220, 230, 240 for identifier allocating and/or identifier mapping of network services are shown.

The first network entity 200 comprises a service mapper 201 and is located on the customer service layer (CS). The second network entity 210 comprises a network service mapper 211 and is assigned to the network service layer (NS), the third network entity 220 comprises a network slice instance mapper 221 and is assigned to the network slice instance layer, the fourth network entity 230 comprises a network subnet slice instance mapper 231 and is assigned to the network subnet slice instance layer and the fifth network entity 240 comprises an infrastructure mapper 241 and is assigned to the infrastructure resources layer.

Triggered by a service request from a customer the end to end interaction of these network entities, in particular local mapping components, runs as follows:

In step 1, the service mapper 201 of the first network entity 200 creates a service with an associated service identifier. The service identifier (S-ID) is generated by the first network entity 200, in particular by the service mapper 201. The network entity 200 stores the service identifier in a database 207. Assuming that the service is composed of a single network service and a top-down mapping is considered between the network entity 200 and 210, the service mapper 201 will connect to the responsible network service mapper 211 (NS mapper). The identifier (S-ID) is sent via an interface 250, in particular identifier management interface, to the network service mapper 211. The network service mapper 211 receives the actual service identifier and generates a local identifier, in particular a local network service identifier (NS-ID), maps the received identifier (S-ID) with the local identifier (NS-ID) and stores the mapping in a database 217a. In the case of a bottom-up mapping between the network entity 200 and 210, a request will be initiated from the management function of the network entity 200 to the management function of the network entity 210. Then the NS mapper 211 generates local identifier(s) (NS-IDs) and the local identifier(s) is sent to the service mapper 201 via the interface 250. After a successfully receiving of the identifier(s) (NS-IDs) the service mapper 201 maps the identifier(s) (NS-IDs) with its local ID (S-ID) and stores in the corresponding database 207.

In step 2, the network service mapper 211 will create a database entry at a database 217b for mapping the network service identifier and the corresponding network slice instance identifier if a bottom-up mapping is considered between the NS mapper 211 and the NSI mapper 221. The network service mapper 211 will request the network slice instance identifier(s) from the corresponding network slice instance mapper 221. The network slice instance mapper 221 of the network entity 220 will generate and send the local identifier (NSI-ID) to the network service mapper 211 via an interface 251. After a successful sending of the identifier(s) (NSI IDs) the network service mapper 211 maps the identifier(s) in the database 217b of the network entity 210.

In step 3 the same procedures take place between the network slice instance mapper (NSI mapper) 221 and the network subnet slice instance mapper (NSSI mapper) 231. The NSSI mapper 231 generates the local network subnet slice instance identifier or in case of multiple network subnet slice instances multiple identifiers for the received network slice instance identifier and stores the mapping in the database 227b (NSMF DB) of the network entity 220 if a top-down mapping is considered. Otherwise, the requested NSSI-ID(s) will be sent to the network slice instance mapper via an interface 252. Then the network slice instance mapper (NSI mapper) maps the NSSI-ID to its local NSI-ID and stores in the database 227a.

In step 4, which is similar to steps 1 to 3, an infrastructure mapper generates local identifiers for the constituents of the network subnet slice instance, such as one or multiple network functions (NF) which can be either virtual or physical NF, one or multiple virtual network function links (VNL) or one or multiple virtual subnet links (VSL). If the infrastructure mapper 241 receives the NSSI-ID from the network slice subnet instance mapper 231, the infrastructure mapper 241 maps and stores the mapping of the identifiers in the local databases 247a, 247b, 247c for the corresponding values. If the infrastructure mapper 241 receives a request for the resources ID from the network slice subnet instance mapper 231, the infrastructure mapper 241 sends the local identifiers of the constituents of the network subnet slice instance to the NSSI mapper 231. The mapping of the network subnet slice instance identifier to its constituents will be stored in the database 237b of the network entity 230.

Each network entity 200, 210, 220, 230, 240 is attached to a management function 260, 261, 262, 263, 264 of the corresponding service layer. The management function 260, 261, 262, 263, 264 controls the interactions of the network entities 200, 210, 220, 230, 240 on the different service layers. The network entities 210, 220, 230 comprises two databases for mapping the managed entities of the upper and lower service layer in case of top-down-mapping or bottom up-mapping.

In a further case a hybrid mapping is considered, in which a combination of top-down and bottom-up mapping occurs at any service layer.

In a first step the NSI mapper 221 receives a network service identifier (NS-ID) from the NS mapper 211. The NSI mapper 221 generates a local identifier, in particular a local network service identifier (NS-ID), maps the received identifier (S-ID) with the local identifier (NS-ID) and stores the mapping in the database 227a in case of a top-down mapping.

In case of a bottom-up mapping between the network entity 220 and 230, a request will be initiated from the management function of the network entity 220 to the management function of the network entity 230. Then the NSI mapper 221 receives at least one local identifier from the NSSI mapper 231 and the NSI mapper 221 maps the identifier(s) (NSI-IDs) with its local ID (NSI-ID) and stores in the corresponding database 227.

Figure 3:
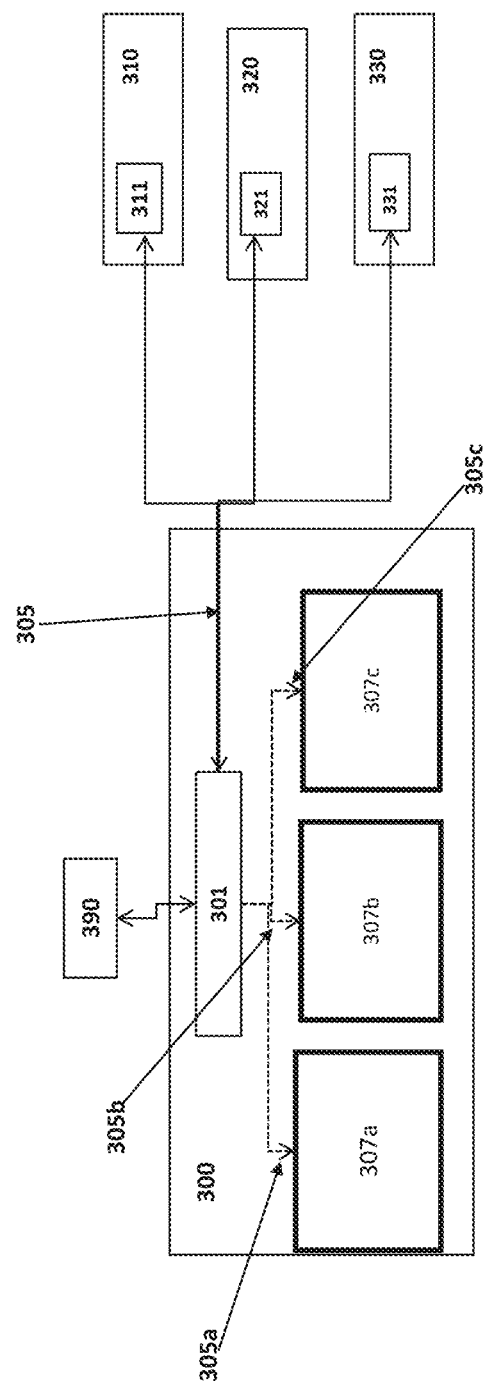
FIG. 3 shows a schematic diagram regarding a user equipment request according to an embodiment of the present invention.

FIG. 3 shows a user equipment 390, an entity 300 and three network entities 310, 320, 330.

The entity 300 comprises a mapping function 301. The mapping function 301 is a S-NSSAI mapper. Further, the entity comprises three databases 307a, 307b the, 307c. Each database is accessible via an internal interface 305a, 305b 305c. The entity 300 further comprises an identifier management interface 305.

In this embodiment, in case mapping is required for the single network slice selection assistance information (NS-SAI) of a user equipment 390, the entity 300 is configured to generate a further identifier of a further network service, wherein the further network service is the service instance (NS) or a network slice instance (NSI) or a network slice subnet instance (NSSI).

In case, where a service is exposed on a network service layer the local mapping of identifiers takes place between the mapping function 301, in particular the S-NSSAI mapper 301 and a network service mapper 311 of the network entity 310.

In case, where the service is exposed on a network slice instance layer the local mapping of identifiers takes place between the mapping function 301 and a network slice instance mapper 321 of the network entity 320.

In case whether service is exposed on a network subnet slice instance layer the local mapping of identifiers takes place between the mapping function 301 and a network subnet slice instance mapper 331 of the network entity 330.

Figure 4:
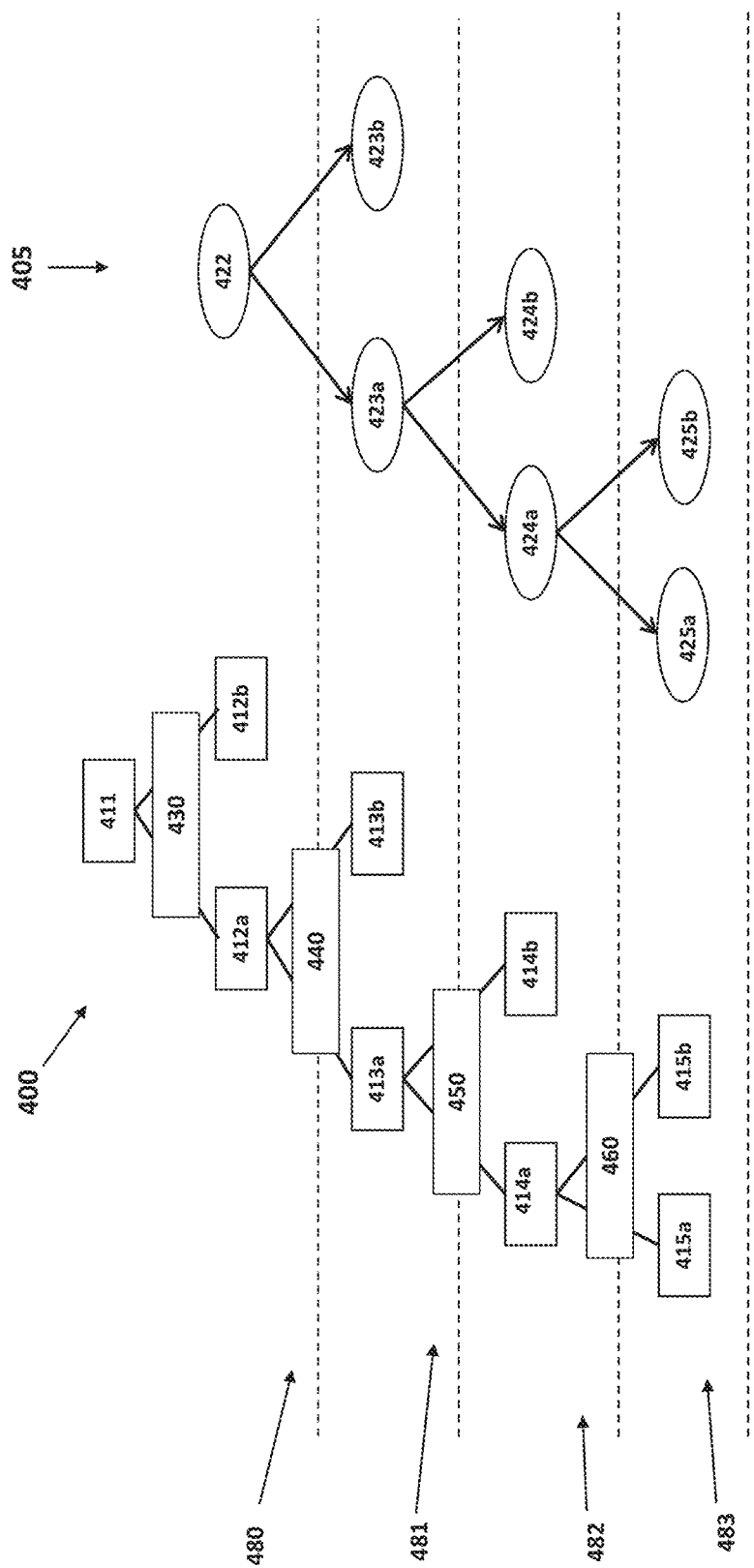
FIG. 4 shows a schematic overview regarding end-to-end network service identification management according to an embodiment of the present invention.

FIG. 4 shows a schematic overview regarding end-to end-service identification management according to an embodiment of the present invention.

FIG. 4 shows a network service management function architecture 400 and the network service managed entity architecture 405. Each architecture comprises a layered structure. The first layer is the network service layer 480, the second layer is the network slice instance layer 481, the third layer is the network slice subnet layer 482 and the fourth layer is the infrastructure layer 483.

In the service management function architecture 400 each layer 480, 481, 482, 483 comprises at least one management function 411, 412a, 412b, 413a, 413b, 424a, 414b, 415a, 415b. For example, a network slice management function 413a is located on the network slice instance layer 481.

In the network service managed entity architecture 405 each layer 480, 481, 482, 483 comprises a managed entity 422, 423a, 423b, 424a, 424b, 425a, 425b. The managed entity is a network service 422, a network slice instance 423a, 423b, a network slice subnet instance 424a, 424b and a network function (NF), 425a, 425b or a virtual subnet link VSL, 425a, 425b or a virtual network function link VNL, 425a, 425b.

The layered structure of each architecture 400, 405 can be divided across multiple operators (administrative domains) or across multiple technical domains.

An administrative domain refers to a collection of systems and networks each operated by a single organisation or administrative authority, such as an operator according to ETSI GS NFV-MAN 001 V1.1.1.

Further, a cross-domain operation may occur at any layer of the network service management function architecture or at any layer of the network service managed entity architecture.

Furthermore, in case of a service mapping across administrative domains, this takes place between a management function in a first operator network and a management function in a second operator network. Each management function is assigned to the same layer 480, 481, 482, 483.

Figure 5:
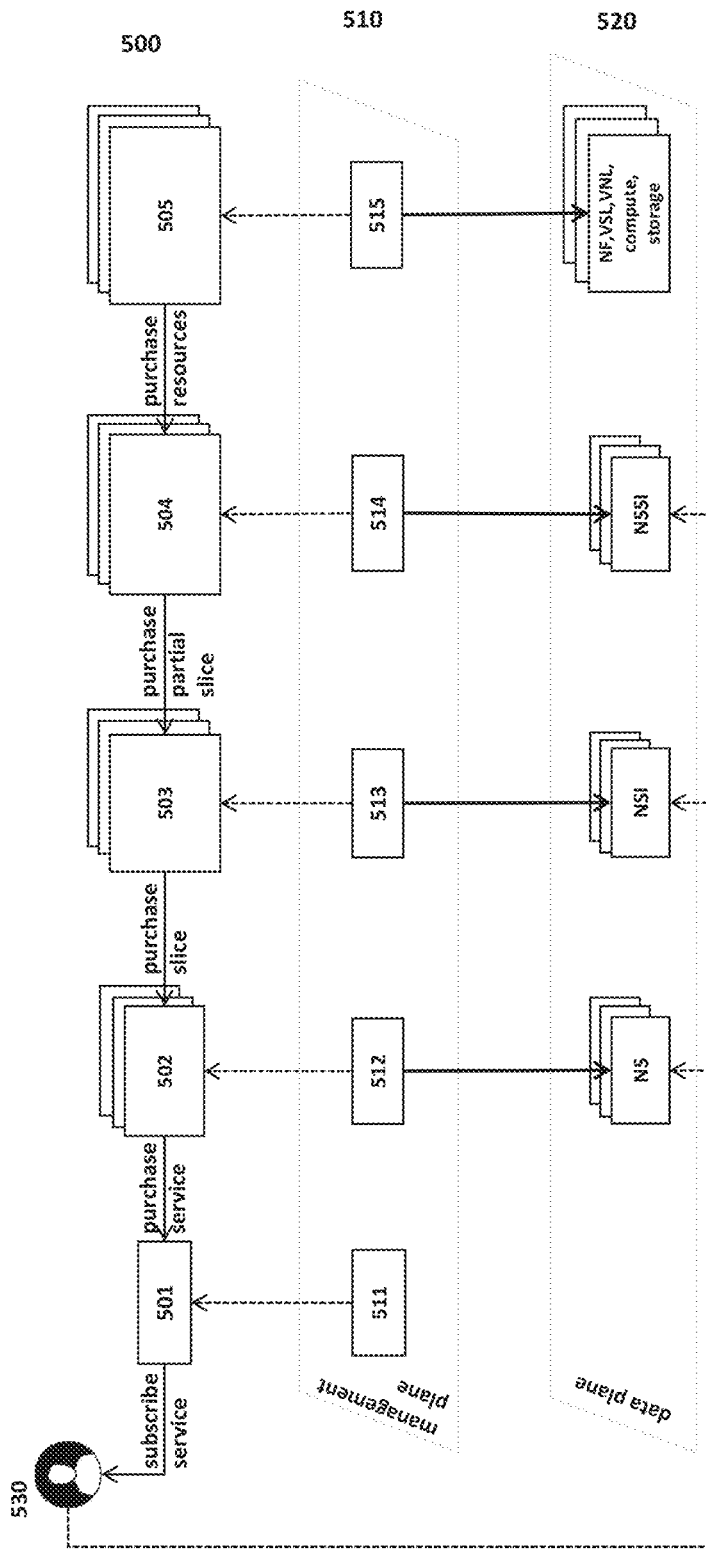
FIG. 5 shows a schematic diagram regarding business roles according to an embodiment of the present invention.

FIG. 5 shows a schematic diagram regarding business roles according to an embodiment of the present invention.

In this embodiment, FIG. 5 shows the different business roles, management functions and managed entities in a layered structure.

On the first service layer 500 the different business roles like end user 530, customer 501, service provider 502, slice provider 503, partial slice provider 504 and infrastructure provider 505 are shown.

On the second service layer 510 the different management functions 511, 512, 513, 514, 515 are shown. A management function can be the service management function (SMF) 512, a customer service management function 511, and network slice management function 513, network slice subnet management function 514, and an infrastructure management function 515. The second service layer is assigned to the management plane in a communication system.

On the third service layer 520 the different managed entities (NS, NSI, NSSI, NF, VSL, VNL) managed by the respective management functions of the second service layer are shown. The third service layer is assigned to the data plane in a communication system.

A customer 501 has to be understood as a business or company offering services to other third party customers or end-users and subscribing services to other third party customers or end-users. Further, this customer purchases the services to at least one service provider. For example, a service provider is an operator.

The at least one service provider 502 purchases a slice to at least one slice provider 503.

The at least one slice provider 503 purchases parts of the slice or partial slices to at least one partial slice providers 504.

The partial slice provider 504 purchases resources, in particular compute resources, storage resources and networking resources from at least one infrastructure provider 505.

For example, the infrastructure provider 505 can be the operator owning the physical components of his network or the infrastructure provider 505 can be a business offering special components for storing, for example a data warehouse infrastructure provider.

FIG. 5 also shows a scenario in which a customer 501, for example an automotive company or automotive industry, purchases a service from a service provider 502, for example an operator. The service is composed of one or more network services, where in each network service is composed of one or more network slices.

After receiving a service request from the automotive industry or company the operator creates a service associated with a service identifier. In this embodiment, the service is composed of a single network service. Therefore, the operator creates and identifies the network service (NS). Further, assuming that the network service is also composed of one network slice, the operator creates the network slice instance and generates a network slice instance identifier. The operator will generate a different identifier if the same customer or another customer purchases the same service, network service or network slice request. It is also possible to have a service, which is composed of multiple network services and these services are composed of multiple network slice instances. Furthermore, these different scenarios are possible in a single operator network or across multiple network operators.

In a further embodiment of FIG. 5 an example scenario is a Platooning service according to 3GPP TS 22.186 v15.2.0, Enhancement of 3GPP support for V2X (Vehicle-to-Vehicle or Vehicle-to-Infrastructure) scenarios. One scenario requires multiple network services such as cooperative driving for vehicle platooning and information sharing for platooning between user equipment 530 (UE) supporting a V2X application and a road side unit (RSU). This network service is offered by a service provider 502 or a customer 501. The first part of the network service for cooperative driving for vehicle platooning may require one or multiple network slice(s) (NSI) for cooperative driving. The second part of the network service for information sharing for platooning between user equipment 530 (UE) supporting the V2X application and the RSU may require at least a network slice instance (NSI) for URLCC (Ultra-Reliable and Low Latency Communication), which is defined by 3GPP TS 23.501 v0.5.0, "System Architecture for the 5G System".

Figure 6:
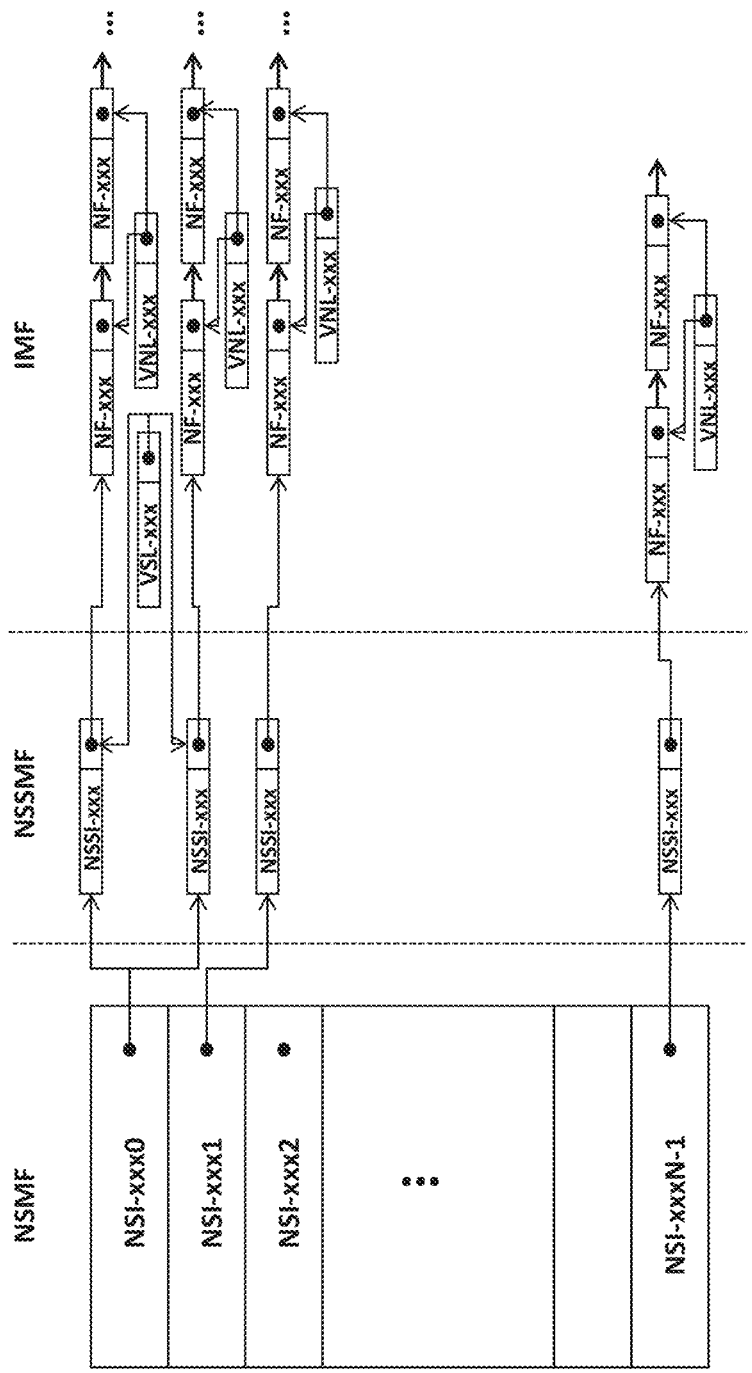
FIG. 6 shows a schematic flow diagram of a method according to an embodiment of the present invention.

FIG. 6 shows a schematic flow diagram of a method according to an embodiment of the present invention.

In this embodiment, a hash table based identifier mapping is shown. The hashing mechanism is usable in each database of a network entity according to the present invention.

Hashing is used to index and retrieve items in a database by using hash keys to find the corresponding value. For example, in the database of the third network entity of FIG. 2 in which the network slice instance identifier (NSI-ID) is used as a key, the values of the composed network subnet slice instances can be retrieved as shown in FIG. 6. In the database 237b of the fourth network entity 230 of FIG. 2 (NSSMF-DB) using the network subnet slice identifier as a key the corresponding infrastructure identifier (NF-ID, VNL-ID) can be retrieved.

Hash-based identifier mapping can be used to support the identifier allocation and identifier mapping method in the network entity, in particular in the local mapper.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A network entity for identifier mapping in a mobile communication system being configured to comprise network slice instances and network subnet slice instances, comprising:
a processor and a memory storing executable instructions, the processor being configured to execute the executable instructions to:
receive a first identifier of a first network service;
generate a second identifier of a second network service; and
map the second identifier to the first identifier,
wherein one of the first identifier and the second identifier is a network slice instance ID (NSI-ID);
wherein a mapping is required for a single network slice selection assistance information (NSSAI) from a user equipment, and the processor is further configured to:
generate a further identifier of a further network service; and
map the further identifier to the single network slice selection assistance information (NSSAI), wherein the further network service is a service instance (NS) or a network slice instance (NSI) or network slice subnet instance (NSSI).

2. A network entity according to claim 1, wherein the processor is further configured to send the second identifier to a second network entity for identifier mapping.

3. A network entity according to claim 2, wherein the network entity is located on a first service layer and the second network entity is located on a second service layer, wherein the first service layer is an upper service layer or a lower service layer compared to the second service layer.

4. A network entity according to claim 2, wherein the network entity is located on a first service layer and the second network entity is located on a second service layer, wherein the first service layer and the second service layer are on a same level.

5. A network entity according to claim 1, wherein the first identifier is a network service instance ID (NS-ID) and the second identifier is a network slice instance ID (NSI-ID), or the first identifier is a network slice instance ID (NSI-ID) and the second identifier is a network slice subnet instance ID (NSSI-ID).

6. A network entity according to claim 1, wherein the first identifier is a network slice subnet instance ID (NSSI-ID) and the second identifier is a network slice instance ID (NSI-ID), or the first identifier is a network slice instance ID (NSI-ID) and the second identifier is a network service instance ID (NS-ID).

7. A network entity according to claim 1, wherein the network entity is attached to a network management function, and wherein the network management function is responsible to manage the same service layer as the network entity.

8. A network entity according to claim 1, wherein the network entity is a NSMF or NSSMF.

9. A network entity according to claim 4, wherein one of the first service layer and the second service layer is: a service layer, a network slice instance layer, or a network slice subnet instance layer in a management function architecture.

10. A network entity according to claim 1, wherein one of the first network service and the second network service includes: a 5G communication service, a network slice instance (NSI), or a network slice subnet instance (NSSI).

11. A method performed by a network entity for identifier mapping in a mobile communication system being configured to comprise network slice instances and network subnet slice instances, comprising:
receiving a first identifier of a first network service,
generating a second identifier of a second network service, and
mapping the second identifier to the first identifier;
wherein one of the first identifier and the second identifier is a network slice instance ID (NSI-ID);
wherein a mapping is required for a single network slice selection assistance information (NSSAI) from a user equipment, and the method further comprises:
generating a further identifier of a further network service; and
mapping the further identifier to the single network slice selection assistance information (NSSAI), wherein the further network service is a service instance (NS) or a network slice instance (NSI) or network slice subnet instance (NSSI).

12. A method according to claim 11, further comprising: sending the second identifier to a second network entity for identifier mapping.

13. A method according to claim 11, wherein the network entity is located on a first service layer and the second network entity is located on a second service layer; and
wherein the first network service layer is an upper service layer or a lower service layer compared to the second service layer.

14. A method according to claim 11,
wherein the first identifier is a network service ID (NS-ID) and the second identifier is a network slice instance ID (NSI-ID), or the first identifier is a network slice instance ID (NSI-ID) and the second identifier is a network slice subnet instance ID (NSSI-ID).

15. A method according to claim 11, wherein the first identifier is a network slice subnet instance ID (NSSI-ID) and the second identifier is a network slice instance ID (NSI-ID), or the first identifier is a network slice instance ID (NSI-ID) and the second identifier is a network service instance ID (NS-ID).

16. A method according to claim 11, wherein the network entity is attached to a network management function, and wherein the network management function is assigned to the same service layer as the network entity.

17. A method according to claim 11, wherein the method is performed by a NSMF or a NSSMF.

18. A method according to claim 11, wherein one of the first network service and the second network service includes: a 5G communication service, a network slice instance (NSI), a network slice subnet instance (NSSI).

19. A non-transitory computer-readable medium comprising program code that, when executed by a processor of a network entity in a mobile communication system configured with network slice instances and network subnet slice instances, causes the network entity to perform the following steps:

receiving a first identifier of a first network service, generating a second identifier of a second network service, and mapping the second identifier to the first identifier;

wherein one of the first identifier and the second identifier is a network slice instance ID (NSI-ID);

wherein a mapping is required for a single network slice selection assistance information (NSSAI) from a user equipment, and the program code causes the network entity to perform further steps of:

generating a further identifier of a further network service; and mapping the further identifier to the single network slice selection assistance information (NSSAI), wherein the further network service is a service instance (NS) or a network slice instance (NSI) or network slice subnet instance (NSSI).

* * * * *